United States Patent
Priborsky et al.

(10) Patent No.: US 7,480,754 B2
(45) Date of Patent: Jan. 20, 2009

(54) ASSIGNMENT OF QUEUE EXECUTION MODES USING TAG VALUES

(75) Inventors: Anthony L. Priborsky, Lyons, CO (US); Robert B. Wood, Niwot, CO (US)

(73) Assignee: Seagate Technology, LLC, Scotts Valley, CA (US)

( * ) Notice: Subject to any disclaimer, the term of this patent is extended or adjusted under 35 U.S.C. 154(b) by 726 days.

(21) Appl. No.: 10/608,252

(22) Filed: Jun. 27, 2003

(65) Prior Publication Data

US 2004/0264284 A1     Dec. 30, 2004

(51) Int. Cl.
*G06F 13/18* (2006.01)
*G06F 9/00* (2006.01)

(52) U.S. Cl. ............... 710/112; 712/229; 712/220; 712/225; 712/245; 710/54; 718/102; 711/112

(58) Field of Classification Search .............. 711/112, 711/4, 6, 152, 154, 155, 158, 163, 164, 170–173; 714/48, 52; 365/232; 710/54
See application file for complete search history.

(56) References Cited

U.S. PATENT DOCUMENTS

| | | | |
|---|---|---|---|
| 5,341,351 A * | 8/1994 | Ng .................... | 711/112 |
| 5,696,931 A | 12/1997 | Lum | |
| 5,701,450 A | 12/1997 | Duncan | |
| 5,715,418 A | 2/1998 | Atsatt | |
| 5,737,547 A * | 4/1998 | Zuravleff et al. ........ | 710/112 |
| 5,822,772 A * | 10/1998 | Chan et al. ............ | 711/158 |
| 5,966,045 A | 10/1999 | Asakura | |
| 6,026,469 A * | 2/2000 | Hoang et al. .......... | 711/118 |
| 6,137,807 A | 10/2000 | Rusu | |
| 6,170,031 B1 | 1/2001 | Clay | |
| 6,192,492 B1 | 2/2001 | Masiewcz | |
| 6,321,233 B1 * | 11/2001 | Larson .................. | 707/201 |
| 6,366,980 B1 * | 4/2002 | Haines et al. .......... | 711/112 |
| 6,430,642 B1 | 8/2002 | Stracovsky | |
| 6,490,635 B1 * | 12/2002 | Holmes ................. | 710/3 |
| 6,516,426 B1 | 2/2003 | Forehand | |
| 6,532,502 B1 * | 3/2003 | Takaki .................. | 710/52 |
| 6,546,439 B1 | 4/2003 | Strongin | |
| 6,618,825 B1 * | 9/2003 | Shaw .................... | 714/55 |
| 6,640,258 B2 * | 10/2003 | Espeseth et al. ......... | 710/5 |
| 6,721,906 B1 * | 4/2004 | Hirashita et al. ........ | 714/54 |
| 7,159,073 B2 * | 1/2007 | Longo et al. ........... | 711/113 |
| 2001/0008009 A1 * | 7/2001 | Johnson ................ | 711/128 |

(Continued)

OTHER PUBLICATIONS

Microsoft Press Computer Dictionary, 5th Ed., 2002, p. 445.*

*Primary Examiner*—B. James Peikari
(74) *Attorney, Agent, or Firm*—Hensley Kim & Holzer, LLC (57) ABSTRACT

The queue execution mode is selected based on the unique tag that is assigned to the command. In one method embodiment a tag is assigned for each of several disc access commands sent by the host. Two or more queues are created, each having a queue execution mode. Which of the queues is assigned to the command depends on the command's tag. One device embodiment comprises a data storage disc, a memory, and a controller. The memory is configured to hold several pending commands for accessing the disc(s), each of the commands having a unique tag. The controller is configured to execute each queued command according to a mode that is determined base on the command's tag.

33 Claims, 6 Drawing Sheets

U.S. PATENT DOCUMENTS

2001/0011296 A1* 8/2001 Chidambaran et al. ...... 709/203
2003/0046472 A1* 3/2003 Morrow ...................... 710/305
2004/0019734 A1* 1/2004 Day et al. ................... 710/315

* cited by examiner

| FEAT | 0xEE | Queue Attributes 405 |
|---|---|---|
| SC | 0x00 – 0x10 | Priority Queues 415 |
| | 0x11 | Abort Handling Queue 425 |
| | 0x12 | AV Attribute Queue 435 |
| LL | 0-31 | LBA Low 445 |
| LM | 0-31 | LBA Mid 455 |
| LH | | LBA High 465 |
| Dev | | Device 475 |
| Com | 0xEF | Command 485 |

| Feat | SC | LL | LM | LH | Dev | Cmd | |
|---|---|---|---|---|---|---|---|
| 0xEE | 0x00 | 0x00 | 0x05 | 0x00 | 0xA0 | 0xEF | 510 |
| 0xEE | 0x01 | 0x06 | 0x0F | 0x00 | 0xA0 | 0xEF | 520 |
| 0xEE | 0x11 | 0x0E | 0x17 | 0x00 | 0xA0 | 0xEF | 530 |
| 0xEE | 0x12 | 0x18 | 0x1F | 0x00 | 0xA0 | 0xEF | 540 |

| 601 | 602 | |
|---|---|---|
| Queue Read (tag = 0x0) | | ← 611 |
| Queue Read (tag = 0x6) | | ← 613 |
| Queue Read (tag = 0xB) | | ← 615 |
| Queue Write (tag = 0x1) | | ← 617 |
| | Complete tag 0x1 | 620 |
| | Complete tag 0x0 | 622 |
| | Complete tag 0x6 | 624 |
| | Complete tag 0xB | 626 |
| ... | ... | |
| Queue Read (tag = 0x10) | | ← 631 |
| Queue Read (tag = 0x13) | | ← 633 |
| Queue Read (tag = 0x12) | | ← 635 |
| Queue Write (tag = 0x11) | | ← 637 |
| Queue Read (tag = 0x17) | Complete tag 0x12 | ← 639 / 640 |
| | Abort 0x10, 0x11 & 0x13 | 642 |
| | Complete tag 0x17 | 644 |
| ... | ... | |
| Queue Read (tag = 0x18) | | ← 651 |
| Queue Read (tag = 0x1B) | | ← 653 |
| Queue Read (tag = 0x00) | | ← 655 |
| Queue Read (tag = 0x1A) | | ← 657 |
| Queue Write (tag = 0x19) | | ← 659 |
| | Complete tag 0x18 | 660 |
| | Complete tag 0x1B | 662 |
| | Error in tag 0x1A | 664 |
| | Complete tag 0x1A in error | 670 |
| | Complete tag 0x19 in error | 672 |
| | Complete tag 0x00 | 674 |

ASSIGNMENT OF QUEUE EXECUTION MODES USING TAG VALUES

FIELD OF THE INVENTION

This application relates generally to command queueing, and more particularly to using tag values in determining how command queues function.

BACKGROUND OF THE INVENTION

Modern data storage systems for use with a host central processing unit ("CPU") usually include at least one disc drive for nonvolatile storage. Each disc drive typically includes one or more discs upon which are one or two data surfaces with addressable tracks and storage sectors. The disc drive unit includes a read/write head for accessing data to be stored or read from each disc storage surface. In drives that use more than one data surface, the collection of all tracks having the same track number on the surfaces defines what is conventionally called a "storage cylinder."

A disc controller is coupled between the host(s) and the storage device to control the flow of data and to control positioning of the disc read/write heads for accessing desired sectors. Data that the host CPU wants to store on a disc is first stored in a buffer memory accessible by the controller. The controller then reads the buffer memory and writes the data to the disc at storage locations specified by the host CPU. Data that the host wants to retrieve from the disc is requested by the host CPU and retrieved from disc to the buffer memory. The data is then sent to the host by the disc controller via a host interface.

The host CPU specifies memory storage locations in terms of physical disc addresses, for example, by specifying disc cylinder, head and sector at which the desired data is to be found or stored. On the other hand, modern computer systems preferably use logical (or "virtual") addressing, with which data is identified by a logical sector address. The necessary physical-logical address conversions take place under control of a local microprocessor associated with the disc controller unit. Generally, to be competitive in the commercial market place, the local microprocessor is a relatively inexpensive, low performance component.

When the host CPU sends a command to the disc controller, task registers within the controller are written to and initialized, for example with respect to sector, head, transfer count, and mode information. The last action associated with this process is the writing of the actual command, e.g., a read command, to the command register within the task registers. Certain bits within the host CPU-issued command inform the disc controller what type of address is being given, e.g., physical CHS or virtual LBA. However, these command bits do not inform the controller as to what action should be taken.

As noted, the first few writes by the host CPU simply load information into the other task registers. The final write is to the command register, at which time the local microprocessor recognizes that this register has been written to. Upon recognition, which can result from polling or from an interrupt mechanism, the local microprocessor fetches the contents of all of the registers. The number of task registers depends upon the standard to which the disc controller conforms. For example, an AT Attachment (or "ATA") compatible controller may have six to ten task registers, whereas a Small Computer System Interface ("SCSI") controller can have sixteen or more registers. These registers are used, for example, to specify the addresses at which the host CPU wishes to read or write.

Unfortunately, conventional protocols offer little or no control over how queued commands are to be performed. The SCSI protocol has a "head of queue" modifier available as a part of its command delivery sequence, for example, to expedite certain commands. Exclusive reliance on such modifiers wastes a valuable opportunity for efficient and versatile control over how queued commands are executed.

SUMMARY OF THE INVENTION

In the present invention, the queue execution mode is selected partially or wholly based on the (unique) tag that is assigned to the command. In a first embodiment of the present invention, a method, a tag is assigned for each of several disc access commands sent by the host. Two or more queues are created, each having a queue execution mode implemented in the disc controller and/or local microprocessor. The command's tag is used to determine which of the queues is assigned to the command.

Suppose that two of the disc access commands are assigned to one standard queue in quick succession. Rather than automatically requiring the commands to be executed First-In First-Out (FIFO), for example, one is selected to be executed before the other based on a comparison between the estimated seek lengths for the respective commands. While the two commands are both still pending, the host sends two more commands, each of which then receives a respective tag. After all four commands are assigned a unique tag and a corresponding queue execution mode, they are executed according to the assigned queue execution mode(s).

In a second alternative embodiment, a contiguous range of tags is established by associating the range with a given queue. In this way, the tags of the range are succinctly associated with the queue execution mode to be used for executing the commands to be placed in that queue. For example, an execution mode tailored for handling video data can be associated with a sequential delivery queue with no error correction, or with less-than-standard error correction. The mode can further be established such that a time-out error is reported if (and only if) a pending command is not completed within a predetermined interval. A queue execution mode can also be readily redefined for a given set of tags, preferably while the tags are not assigned to any command.

In a third alternative embodiment, each in-progress disc access command includes at least one sector address that is held in a task file register while its corresponding data block is transferred through a transducer adjacent to its data storage disc. One of the defined queue execution modes is associated with a first queue and another of the modes is associated with a second queue. These associations are used for addressing sets of queued commands, such as to enable an operation that affects any and all in-store command(s) in the first queue without affecting any command(s) in the second queue. For a newly-received command that has a predetermined "abort trigger" tag or is otherwise recognizable as such a queue-addressing activation, all of the "in-store" commands in the associated queue can be conveniently aborted. (For purposes of this document, a received command is "in store" until and unless it is aborted, in progress, or completed.) This special command with such a trigger tag can be used to initiate a triggered operation affecting one or several in-store commands, in an orderly fashion, commencing when the special command is "in progress."

In a fourth alternative embodiment, a device of the present invention includes one or more data storage disc(s), an actuator having a nominal seek time longer than 1 millisecond, a memory, and a controller. The memory is configured to hold several pending commands for accessing the disc(s), each of the commands having a unique tag. The controller is configured to determine which of a plurality of queue execution modes to use for a selected one of the pending disc access commands based on the selected command's tag.

In a fifth alternative embodiment, the memory is configured to hold the tag as a binary value no larger than one byte, and further includes a multiple-bit state register configured to identify one or more other tags that are available for a future command. The disc controller and/or local microprocessor is configured with software to provide at least two queues, one for a higher-priority execution mode and another for a lower-priority execution mode. The first queue is associated with a total of M tags. The second mode is associated with a total of N tags, where N>0 and M>0.

Additional features and benefits will become apparent upon reviewing the following figures and their accompanying detailed description.

DETAILED DESCRIPTION

Although the examples below show more than enough detail to allow those skilled in the art to practice the present invention, subject matter regarded as the invention is broader than any single example below. The scope of the present invention is distinctly defined, however, in the claims at the end of this document.

Numerous aspects of basic engineering and of channel communications protocols that are not a part of the present invention (or are well known in the art) are omitted for brevity, avoiding needless distractions from the essence of the present invention. For example, this document does not articulate detailed and diverse methods for implementing a disc controller. Neither does it include complete detail about how queues of different types will interact. Specific techniques for deciding logical block address mapping and for prioritizing shorter seeks are likewise omitted, typically being a matter of design choice to those of ordinary skill in that field of technology.

Definitions and clarifications of certain terms are provided in conjunction with the descriptions below, all consistent with common usage in the art but some described with greater specificity. A "tag" is a scalar identifier, typically a one-byte binary value of several bits. A "queue execution mode" specifies how but not where the queued commands are to be executed. For example, a queue execution mode can be a simple binary queue number, but not if the number merely refers to a less-busy one of several queues that are otherwise identical in how they process commands.

Figure 1:
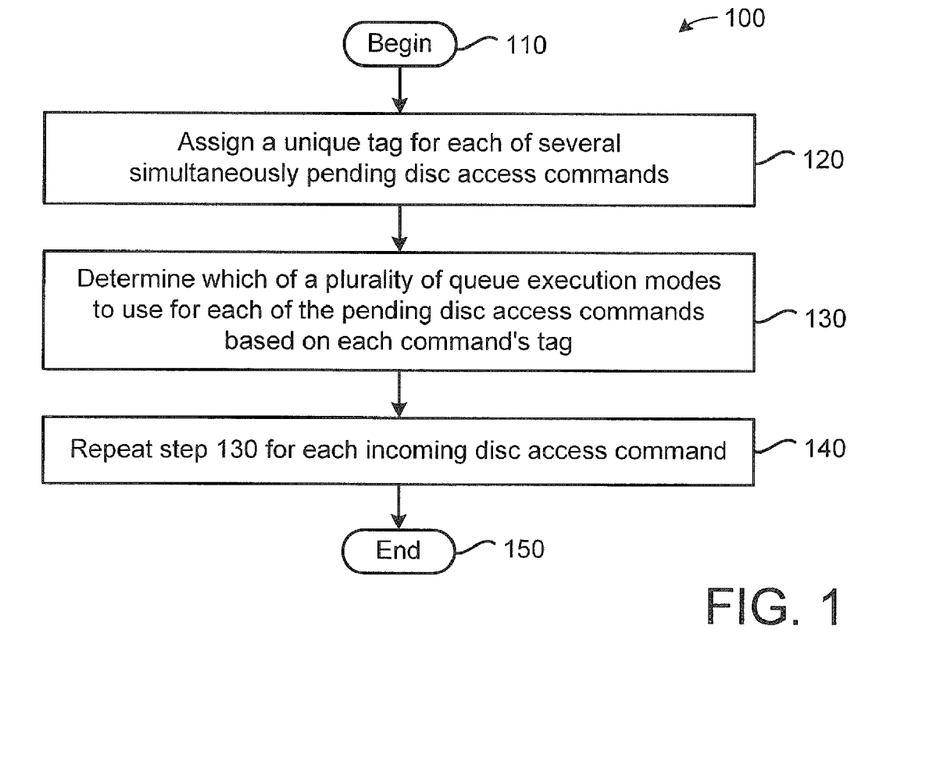
FIG. 1 shows a flowchart of a method of the present invention.

FIG. 1 shows a method 100 of the present invention comprising steps 110 through 150. A unique tag is assigned for each of several simultaneously pending disc access commands 120. Then a queue execution mode is determined for a selected one of the commands, the determination being based on the selected command's tag 130. Step 130 is then repeated for each incoming disc access command 140 as it is received.

Figure 2:
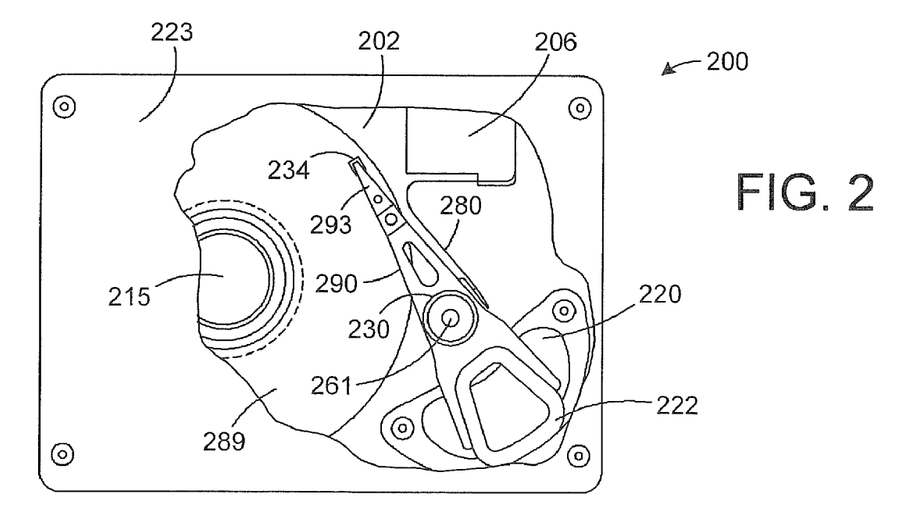
FIG. 2 shows a mechanical drawing of a disc drive system configured to benefit from the present invention.

FIG. 2 shows a "top view" of a hard disc drive 200 constructed to benefit from the present invention. (Terms like "top view" are arbitrary here, in that data handling systems like drive 200 can generally operate in any orientation.) Drive 200 includes "top" cover 223 that cooperates with base 202 to form a sealed chamber. Components supported in the chamber include a spindle motor 215 which rotates one or more data storage disc(s) 289 at hundreds or thousands of revolutions per minute. Information is written to and read from data surfaces on disc(s) 289 through the use of an actuator assembly 261, which rotates during a seek operation about a bearing shaft assembly 230. Actuator assembly 261 includes one or more actuator arms 290 which extend above and below each of the disc(s) 289, with one or more flexures 293 extending from each of the actuator arms. Mounted at the distal end of each of the flexures is a transducer 234 on an air-bearing slider enabling transducer 234 to fly in close proximity adjacent the corresponding surface of an associated disc 289.

Servo and user data travels through transducer 234 and flex cable 280 to control circuitry on controller board 206. (Controller board 206 is configured to interface with a host like disc controller unit 306 of FIG. 3 does, to perform all operations described in this document.) Flex cable 280 maintains an electrical connection by flexing as each transducer 234 seeks along its path between tracks on disc(s) 289.

During a seek operation, the overall track position of transducers 234 is controlled through the use of a voice coil motor (VCM), which typically includes a coil 222 fixedly attached to actuator assembly 261, as well as one or more permanent magnets 220 which establish a magnetic field in which coil 222 is immersed. The controlled application of current to coil 222 causes magnetic interaction between permanent magnets 220 and coil 222 so that coil 222 moves. As coil 222 moves, actuator assembly 261 pivots about bearing shaft assembly 230 and transducers 234 are caused to move across the surfaces of the disc(s) 289 between the inner diameter and outer diameter of the disc(s) 289.

Figure 3:
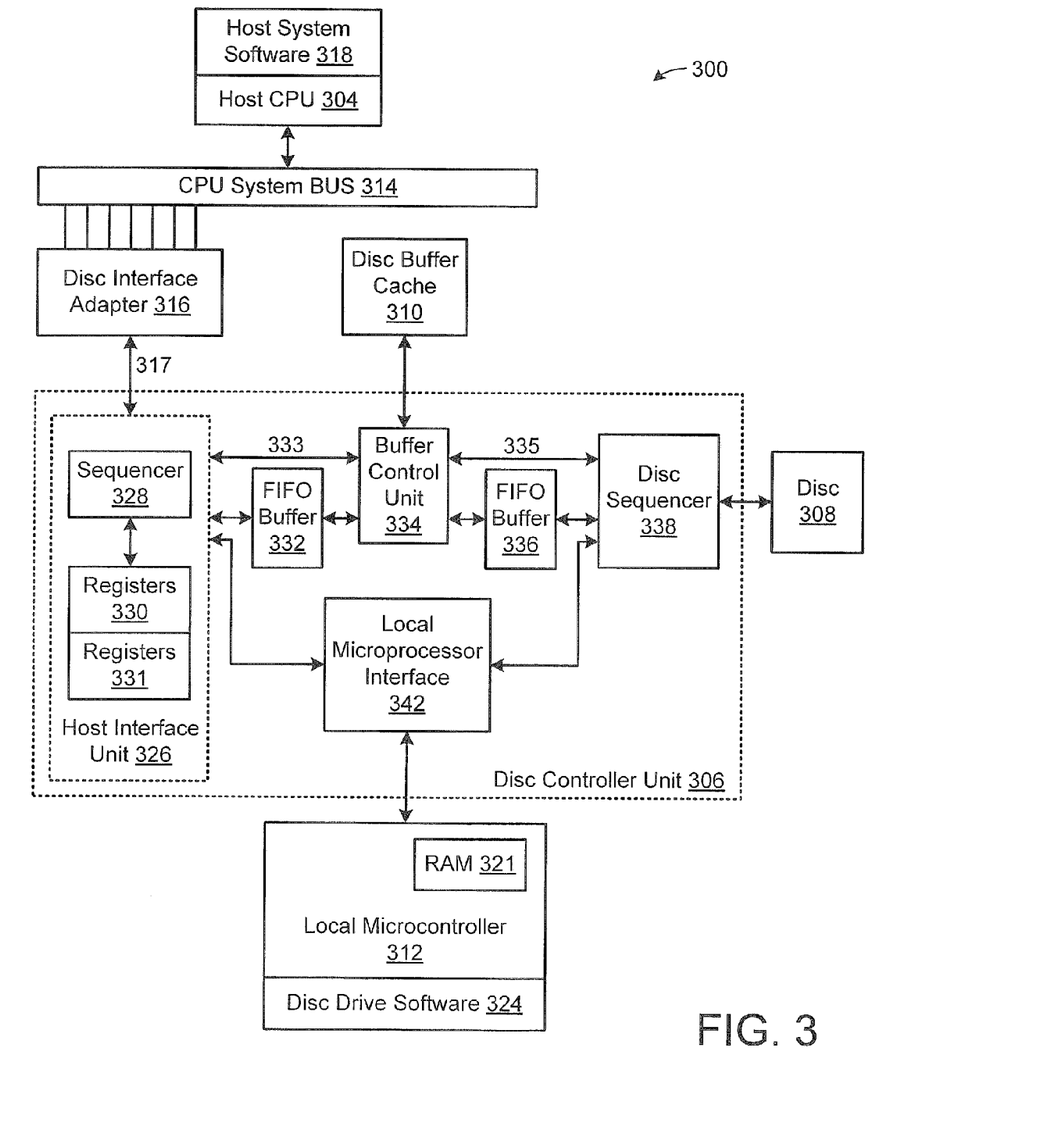
FIG. 3 shows a schematic drawing of a host and data storage system of the present invention, the data storage system able to receive and act on commands as shown in FIGS. 5&6.

FIG. 3 shows a computer system 300 implementing the present invention. Host CPU 304 is configured to communicate with a disc controller unit 306 to transmit data to or from a disc 308. Associated with disc controller unit 306 are disc buffer cache 310 (where data can be temporarily stored to shorten access time) and a local microcontroller 312 that controls unit 306.

Host CPU 304 executes system software 318, and communicates with the disc controller unit 306 through CPU system bus 314, disc interface adapter 316 that provides decode and electrical buffering, and disc interface cable 317. Disc controller unit 306 may be implemented in any number of ways, provided there is general similarity with the industry-accepted AT Attachment ("ATA"), SCSI, or other common interface protocol in effect as of this filing. The host interface protocol defines the interface between a host processor (e.g., CPU 304) communicating over a host bus (e.g., serial ATA bus 314) and a disc controller unit (e.g., unit 306).

Some of these interface protocols define a set of task registers, a disc interface cable connector, and associated interface signals. The defined task register set includes a command register containing the command code being sent to the disc drive, a data register for transferring data blocks between the controller buffer and the host processor, registers concerned with the relevant disc drive address, sector and read/write head, and registers containing status information including error posting.

Some of these interface protocols also require certain real-time CPU-controller interface functions to be performed by the controller unit. For example, an intersector handshake may be required at each sector boundary on a disc, whereby the status of a previous sector must be posted before reading or writing from the next sector. Further, controller unit task file registers may require updating to indicate the identity of the sector currently being transferred. Finally, all write data may be automatically receipted for. One skilled in the art will recognize that many of these optional features of system 300 create synergies with the present invention that can be advantageous.

The example of system 300 is primarily a block interface. Host CPU 304 requests a block of data to or from the controller unit 306 in terms of a physical cylinder-head-sector (CHS) address, but does not specify or control where or in what form that data shall be stored in buffer cache 310, or on the disc 308. Buffer cache 310 is optionally implemented as Dynamic Random Access Memory ("DRAM").

As shown in FIG. 3, controller unit 306 includes a host interface unit 326 preferably comprising a microprocessor-controlled sequencer, or state machine 328 and a set of registers 330, including interface-compliant task registers. Unit 326 further includes buffer control unit 334 that communicates with the interface unit 326 via a First-In First-Out ("FIFO") buffer 332, that communicates with a disc sequencer 338 via a second FIFO buffer 336. Control unit 334 also communicates with the disc buffer cache 310. Disc sequencer 338 transmits data between disc cache 310 (via buffer control 334) and disc 308. Lines 333,335 transmit address and control information to and from buffer control unit 334 as shown.

Controller unit 306 also includes a local microprocessor interface 342 that communicates with the sequencer unit 328, and with a disc sequencer/state machine 338. The disc sequencer 338 is also coupled between FIFO 336 and the disc 308, and preferably also to an Error Correcting Code ("ECC") logic unit (not shown) that corrects data read from the disc 308.

Within controller 306, data is stored in FIFO 336 before either transmission to disc 308 or to buffer cache 310. FIFO buffers 332 and 336 are each sized to hold less than one sector's worth of data. This advantageously permits data stored in FIFO 336 to be read out while data are being written into FIFO 332. Buffer control 334 addresses and provides buffer cache read/write timing signals and controls to the buffer cache 310.

Upon command from the host processor 304, data to or from memory associated with the host CPU is parallel-transferred into the controller unit 306 through the interface unit 326, FIFO 332, and then into the disc buffer cache 310. Upon receipt of a host CPU command, the controller unit local microprocessor 312 is interrupted, or the local microprocessor may simply be in a polling loop, continuously testing to see whether a host CPU command has been received. In either case, once an incoming command is recognized, local microprocessor 312 then reads task file registers (among registers 330) and decodes the command and command bits from the command register.

Task file registers (among registers 330) within interface unit 326 are updated repeatedly during disc drive data transfer operations. As such, the host system software 318 accesses the task file registers 330 to monitor data transfer and to associate errors reported by disc 308 with respect to particular sectors. Task file registers 330 specify the logical disc address to be read/written by the host system 304,316, and will reflect the logical disc address of the sector currently being transferred to or from the host system. Disc drive software 324 also accesses task file registers 330 as the local microprocessor 312 supervises the disc 308, as it executes the host system commands, and as it directs transfer of data to and from disc cache 310 and the storage media within disc 308. Local microprocessor includes RAM 321 which can be used to supplement task file registers 330 for storing key information such as the contents of register 799 (see FIG. 7).

Figure 4:
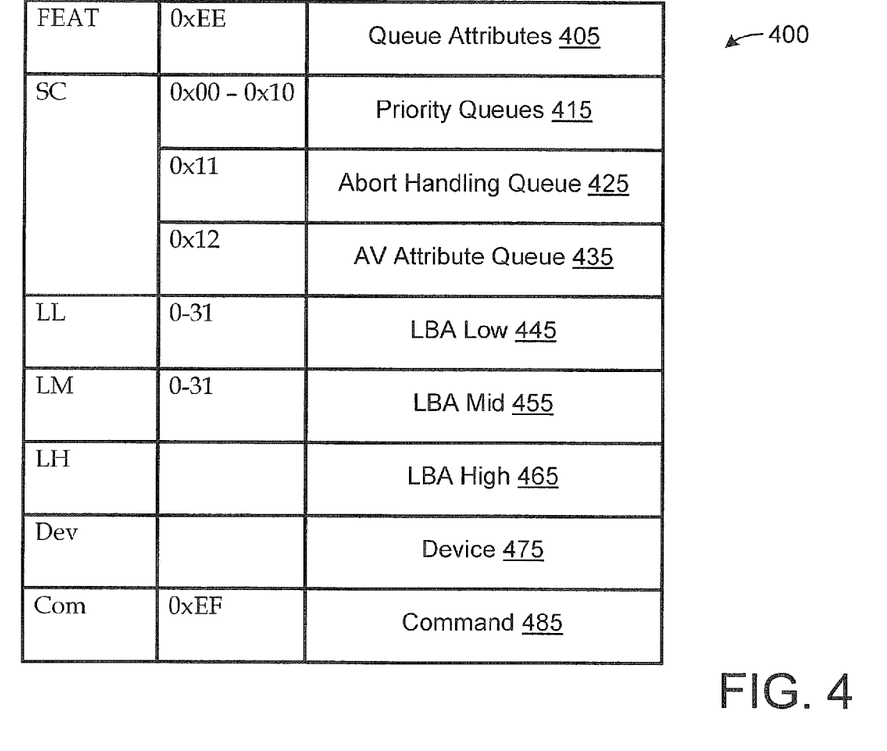
FIG. 4 shows a chart with register definitions for initializing queues for use in the present invention.

FIG. 4 shows a chart 400 showing register definitions 405-485 for initializing queues for use in the present invention. In present-day protocols, for example, these definitions could be used with the ATA SET FEATURES command or with a SCSI MODE SELECT page. At value 0xEE is the "Features" register which is used to set queue attributes 405 (i.e. queue execution modes).

"Sector Count" register values 0x00-0x10 are used to establish "priority queues" 415. These queues each have a priority that is unique relative to the other priority queues. A queue is defined simply by specifying a range of one or more tag values, a queue with lower tag values having a higher priority than one with higher tag values. Within a given queue all pending commands have equal priority, and they may thus be completed in a different order than that in which the host transmits them. For example, commands within a queue may be reordered to expedite a command with a shorter servo seek, enhancing overall performance.

"Sector Count" register value 0x11 is used to establish an "abort handling queue" 425. This queue is defined by a range of tags in which the highest-numbered tag corresponds to a command that includes a request to abort all other outstanding operations in the abort handling queue. When status for the command with the special abort semantics is completed all other commands in the defined tag range will be aborted.

"Sector Count" register value 0x12 is used to establish an "AV attribute queue" 435. This queue is defined by a range of tags in which the commands are assumed to execute in the order they are received, regardless of tag. These commands are performed in an error handling mode that requires each to be completed within 100 milliseconds from the command transfer from the host. Otherwise the command is deemed to have failed, and an error is returned.

The Logical Block Address Low ("LBA Low") register values 0-31 are used to define the start tag of a given queue 445. The "LBA Mid" register values 0-31 are used to define the ending tag of a given queue 455. The "LBA High" register values are reserved, not yet having a defined meaning 465. The "Device" register value has the standard meaning under the present-day ATA protocol 475. "Command" register value 0xEF is used to refer to the "SET FEATURES" command 485.

In this embodiment, the "priority" and "AV attribute" queues are the only ones with defined interactions between the queues. Any other queues can buffer commands to be executed but otherwise operate independently of their counterparts. It will be understood that in a real disc drive which supports all of these queue attributes simultaneously some additional defined interaction policy would normally be needed. For example, the "AV attribute" queue(s) of this embodiment optionally have higher priority than any other queue.

Figure 5:
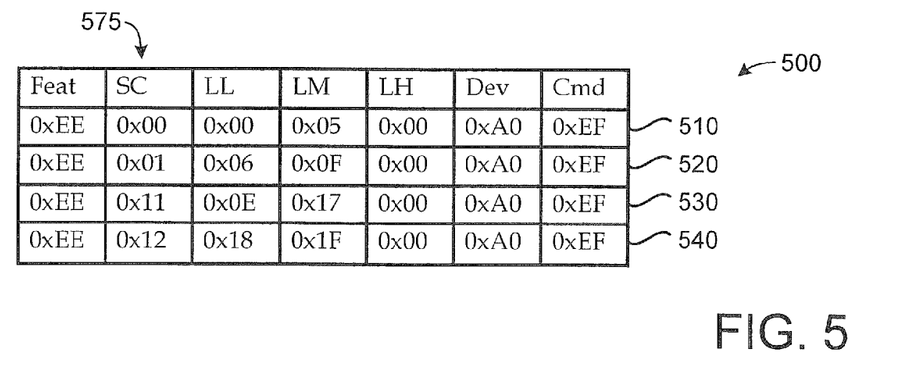
FIG. 5 shows a short series of commands issued by a host CPU establishing the queues for use with the present invention.

FIG. 5 shows a short series 500 of commands issued by host CPU 304 establishing the queues. Command 510 establishes a 6-tag "high-priority" queue consistent with register definition 415. Command 520 establishes an 10-tag medium-priority queue. These two queues are now ready for use and can be used, for example, to perform commands 611 through 617 of FIG. 6.

Returning now to FIG. 5, command 530 establishes a 10-tag abort handling queue. Note that command 530 also re-allocates tags 0x0E and 0x0F so that the queue created by command 520 now has only 8 tags. The queue execution mode associated with these two tags is redefined while the tags are "available" (i.e. not assigned to any command). Command 540 establishes an 8-tag Audio/Visual (AV) attribute queue. Key data from these commands 510-540 is stored in RAM 321 of local microprocessor 312 and/or task file register 330. Note that this data signifies the existence of tags associated with a variety of queue execution modes (in that the values in the "SC" column 575 refer to a diverse variety of register definitions 415,425,435 in FIG. 4).

Figure 6:
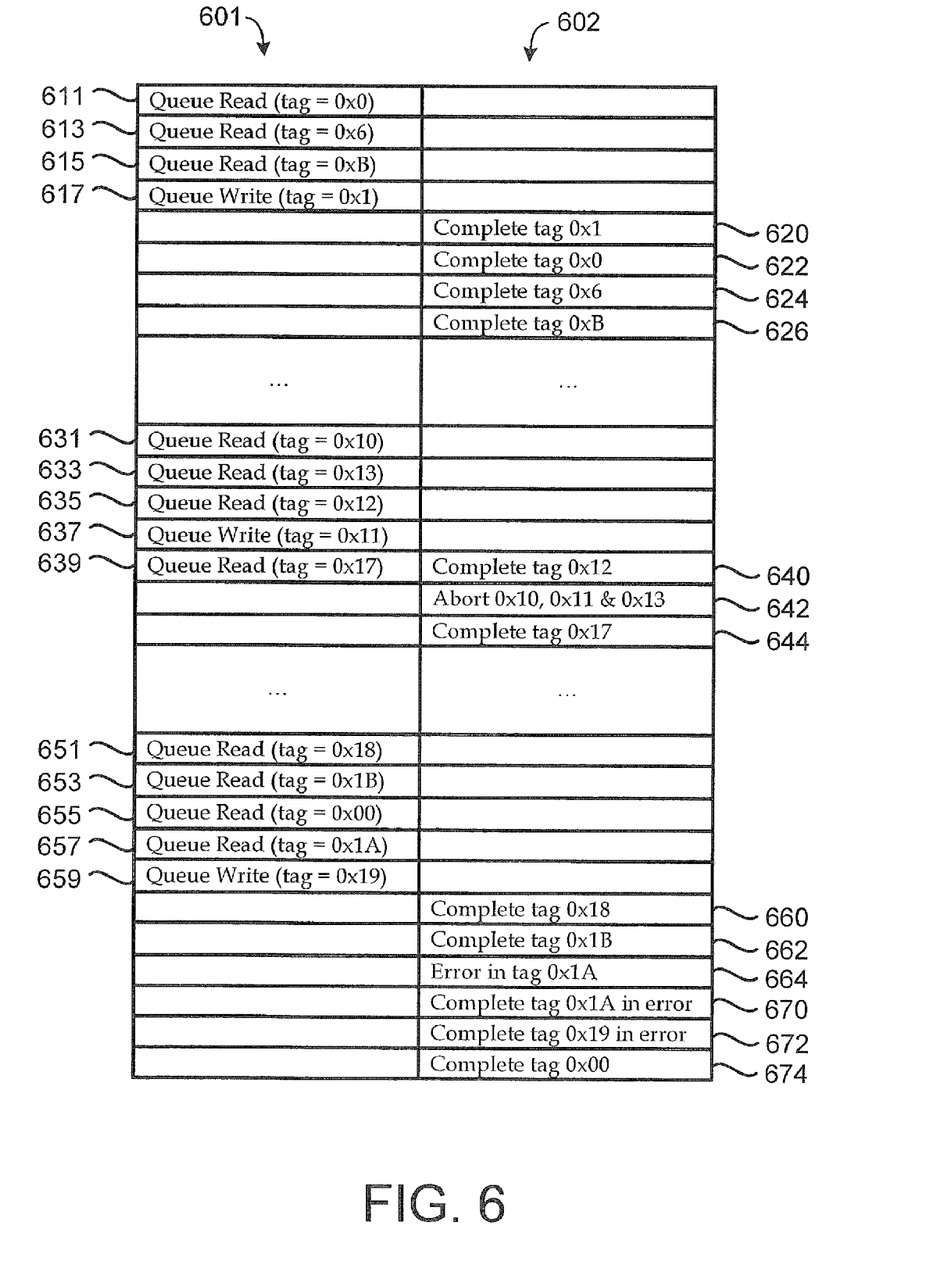
FIG. 6 shows a series of commands issued by the host CPU and a series of responsive actions taken by a local microprocessor.

FIG. 6 shows a series of commands 601 issued by host CPU 304 and a series of responsive actions 602 taken by local microprocessor 312. A read is queued 611 at tag 0x0, a read is queued 613 at tag 0x6, a read is queued 615 at tag 0x0, and a write is queued 617 at tag 0x0. For like-priority tasks, local microprocessor 312 selects which queued command according to predetermined criteria. For present purposes it is assumed that "write" commands receive preferential treatment. Tag 0x1 is completed 620, then tag 0x0 is completed 622, completing the "high priority" queue's tasks. Then tags 0x6 and 0xB are completed 624,626.

There is a lapse of time. Then a read is queued 631 at tag 0x10, a read is queued 633 at tag 0x13, a read is queued 635 at tag 0x12, and a write is queued 637 at tag 0x11. While tag 0x12 is being completed 640, another read is queued 639 at tag 0x17. This last read command does not include a data transfer phase, and thus does not result in any data from disc 308 passing through FIFO buffer 336. Because tag 0x17 is the activation tag of an "abort handling" queue established by command 530, the other commands pending in that queue are aborted 642. Then tag 0x17 is completed 644, signaling final cleanup. In an alternative embodiment, two abort handling queues are also AV attribute queues with differing priority. If the higher-priority one of these receives a command into its abort handling activation tag, that queue is emptied of pending commands. Execution then begins right away on commands pending in the lower-priority AV attribute queue.

There is another lapse of time. Then a read is queued 651 at tag 0x18, a read is queued 653 at tag 0x1B, a read is queued 655 at tag 0x00, a read is queued 657 at tag 0x1A, and a write is queued 659 at tag 0x19. Tags 0x18 and 0x1B are completed 660,662. After tag 0x1A begins, disc controller unit 306 fails to complete tag 0x1A before the expiration of the 100 millisecond AV command time limit. Local processor 312 detects this 664 and transmits an error while completing tag 0x1A 670. Tag 0x19 is likewise completed in error 672, the error being cleared only after the queue is cleared. Execution of the lower-priority read at tag 0x00 is then completed normally 674, unaffected by the AV attribute queue errors.

Figure 7:
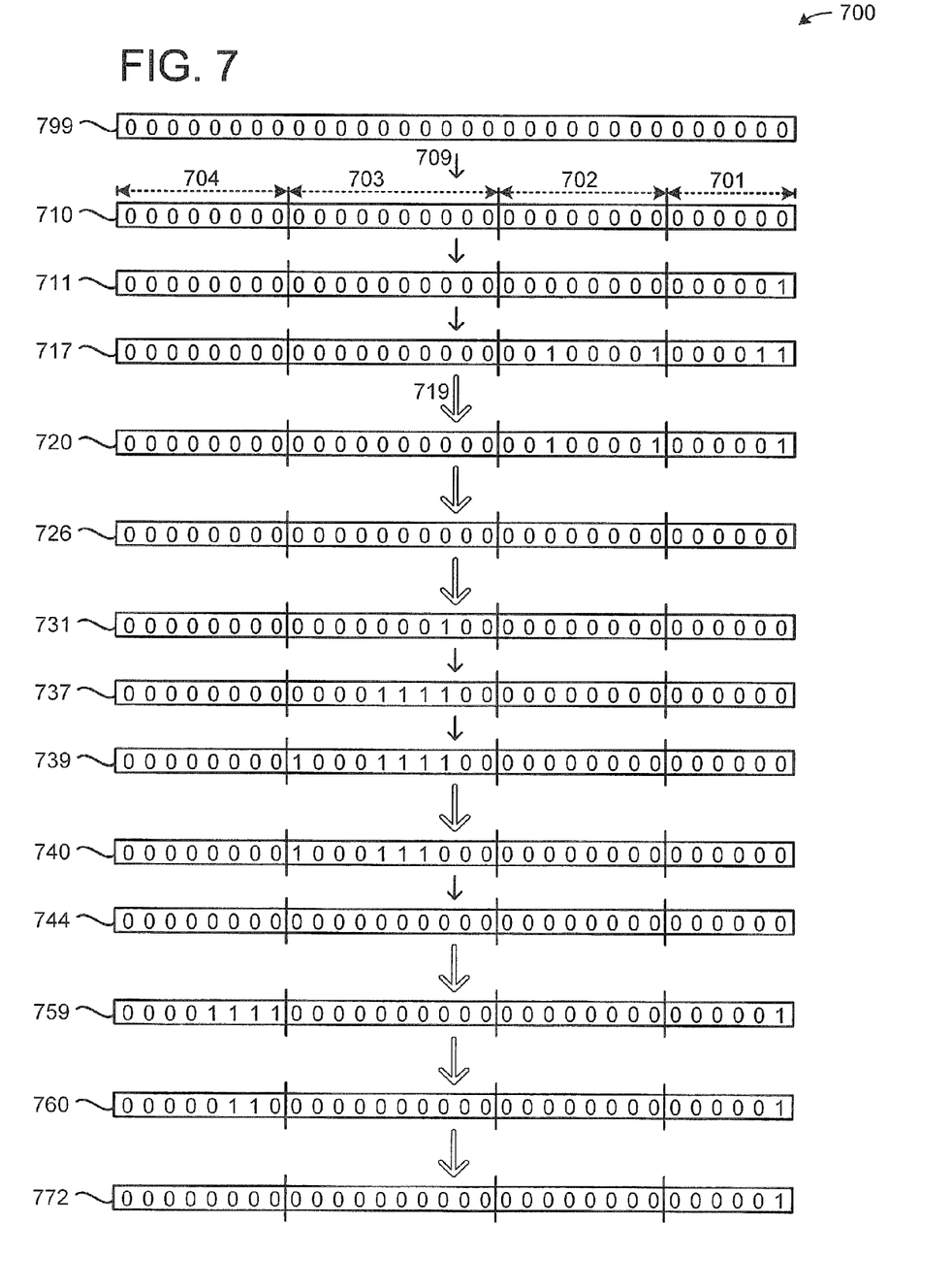
FIG. 7 shows a series of many states of a 32-bit tag availability register illustrating the operation of the present invention.

FIG. 7 shows a series of many states of a 32-bit tag availability register 700 residing in RAM 321 of processor 312. Initially the queue is not partitioned and all 32 of the tags are uniformly configured for a "normal queued data" execution mode: uniform priority, error correction, no AV-related processing, no special command attributes, etc. Zeroes in the initial state of the register 799 indicate that each binary-numbered tag is initially available for allocation to a command, bit zero being farthest to the right. Small arrow 709 indicates when the queue establishment command series 500 (of FIG. 5) is performed. At register state 710, all 32 tags are all still available, but the queue has been partitioned into four queues 701,702,703,704 having attributes as shown in FIGS. 4&5. Each of these has its own special execution mode in this example, and queue 703 actually has an additional "activation" mode. Register state 711 indicates the result of command 611 (of FIG. 6). State 717 indicates the result of command 617.

State 720 indicates the result of action 620, the completion of tag 0x1. Large arrow 719 indicates a generally longer interval of time, one that is long enough for a (mechanical) seek operation across a data surface of disc 308. This is several milliseconds or more, generally unlike the quicker, merely electrical operations marked by small arrows 709. Following action 620, note that a high priority command is still pending at tag 0x0, and that other commands are still pending at 0x6 and 0xB. After action 626, state 726 shows that no commands are pending.

After command 631, state 731 shows that one command is pending at tag 0x10. After command 637, state 737 shows that four commands are pending in abort processing queue 703, but that the other queues 701,702,704 are empty. After command 639, state 739 shows that five commands are pending in queue 703, one of which is the abort activation command at tag 0x17. After command 640, state 740 shows that the command at tag 0x10 has completed. After the abort activation command is completed 644, state 744 shows that all tags in queue 703 are again available.

After loading five more commands into the buffer by steps 651 through 659, state 759 shows that one is in queue 701 and the others are in queue 704. After completing all of the AV attribute actions 660 through 672, state 772 shows that only the command at tag 0x0 (in the high priority queue 701) remains to be completed.

Figure 8:
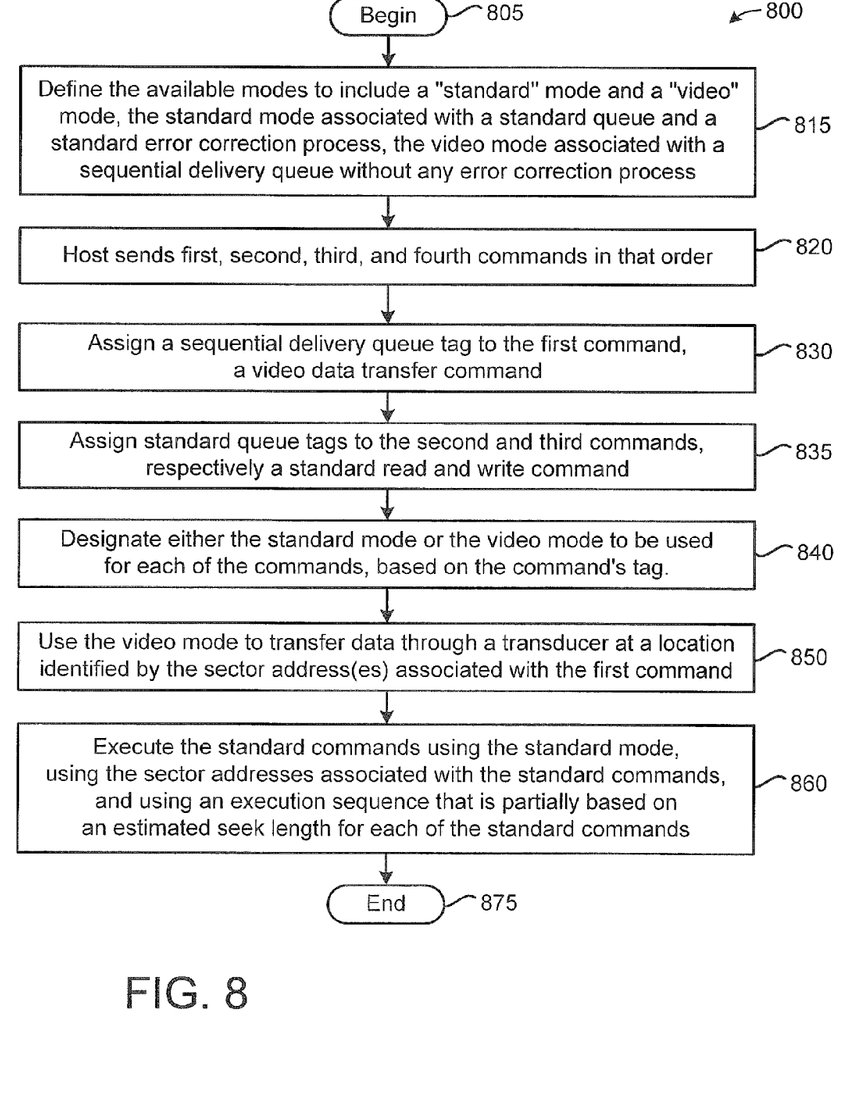
FIG. 8 shows a flowchart of another method of the present invention.

FIG. 8 shows another detailed example, a method 800 of the present invention comprising steps 805 through 875. "Standard" and "video" execution modes are defined 815. Four commands are received 820 from a host. A sequential delivery queue tag is assigned to the first command, a video data transfer command 830. Standard queue tags are assigned to the second command (a read) and the third command (a write) 835. Based on each command's tag, a queue execution mode is selected for each command 840. The video mode is used to transfer data through a transducer at a location identified by the sector address(es) associated with the first command 850. The standard mode is similarly used to transfer data for the second and third command, using an execution sequence that is partially based on an estimated seek length for each of the standard commands 860. That is to say, the standard mode prefers to perform very short seeks before very long seeks, all other things being equal.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the data synchronizing while maintaining substantially the same functionality without departing from the scope and spirit of the present invention. In addition, although most of the embodiments described herein relate to a hard disc drive, it will be appreciated by those skilled in the art that the teachings of the present invention can be applied to other systems such as those using removable data storage media, without departing from the scope and spirit of the present invention.

What is claimed is:

1. A method comprising:
   establishing a plurality of queue execution modes by assigning a unique set of tag values for each of the plurality of queue execution modes; and
   assigning a different unique tag for each of several data access commands, wherein, for each of several data access commands, the assigned unique tag is selected from among the tag values assigned to the plurality of queue execution modes.

2. The method of claim 1, further comprising:
   associating at least two of the data access commands with only one of the queue execution modes; and
   executing the two commands in an order that is partially based on an estimated seek length for each of the two commands.

3. The method of claim 1, wherein at least one of the unique sets of tag values consists of a contiguous range of tag values.

4. The method of claim 1, further comprising:
   holding a sector identifier of the data access command in a task file register; and
   transferring a data block corresponding to the sector identifier through a transducer adjacent to a data storage disc.

5. The method of claim 1, further comprising:
   associating one of the queue execution modes with a first queue;
   associating another of the queue execution modes with a second queue; and
   performing an operation that affects at least one command in the first queue without affecting a command that is in the second queue.

6. The method of claim 1, wherein the plurality of queue execution modes includes an abort handling queue, further comprising aborting a pending data access command based on a newly-received command having a tag assigned to the abort handling queue.

7. The method of claim 1, further comprising redefining a queue execution mode that is associated with at least one tag while the at least one tag is not assigned to any data access command.

8. The method of claim 1, wherein the queue execution modes include a plurality of error correction modes.

9. The method of claim 1, further comprising using at least one of the queue execution modes to transfer video data through a transducer adjacent to a data storage disc.

10. The method of claim 9, wherein the queue execution modes include a sequential delivery mode, wherein a data access command regarding the video data is assigned a tag associated with the sequential delivery mode, the method further comprising using the sequential delivery mode for the data access command regarding the video data.

11. The method of claim 1, wherein the queue execution modes include sequential delivery mode.

12. The method of claim 1 in which a triggered operation is performed on an in-store one of the commands if an in-progress one of the commands is associated with a predetermined trigger tag, and otherwise the triggered operation is generally not performed on the in-store one of the commands.

13. The method of claim 1 further comprising wherein the plurality of queue execution modes includes a queue execution mode that provides that an error is reported if a command associated with a tag assigned to the queue execution mode is not completed within a predetermined interval, and otherwise the error is generally not reported.

14. The method of claim 1 in which assigning a unique tag for each of several data access commands comprises steps of:
   (a1) assigning a first one of the tags to a first-received one of the commands;
   (a2) while the received command is still pending, assigning a second one of the tags to a second-received one of the commands;
   (a3) while the received commands are both still pending, assigning a third one of the tags to a third-received one of the commands; and
   (a4) after the assigning steps (a1)-(a3) are completed, completing the first-, second- and third-received commands.

15. The method of claim 14 in which assigning a unique tag for each of several data access commands further comprises a step (a5) of assigning a fourth one of the tags to a fourth-received one of the commands while the third-received command is still pending.

16. The method of claim 1, wherein the plurality of queue execution modes includes at least a standard mode and a video mode.

17. The method of claim 1, further comprising executing the data access command according to the queue execution modes associated the assigned unique tags.

18. The method of claim 1, wherein a host device establishes the queue execution modes and informs a data storage device which set of tag values is assigned to each queue execution mode.

19. The method of claim 1, wherein the tag values assigned to queue execution modes are sector count register values.

20. A method comprising steps of:
   (a) defining an available set of modes to comprise a standard mode and a video mode, the standard mode associated with a standard queue and configured to use a standard error correction process, the video mode associated with a non-standard queue and not configured to use the standard error correction process;
   (b) assigning a sequential delivery queue tag to a first-received command, the first-received command being a video data transfer command;
   (c) assigning a first standard queue tag to a second-received command while the first-received command is still pending, the second-received command being a standard read command;
   (d) assigning a second standard queue tag to a third-received command while the first- and second-received commands are both still pending, the third-received command being a standard write command;
   (e) assigning another tag to a fourth-received command while the third-received command is still pending;
   (f) designating one of the available set of modes for each of the received commands based on the command's tag; and
   (g) after the assigning steps (b)-(e) and the designating step (f) are completed, completing the received commands.

21. The method of claim 20 in which the completing step (g) is performed by steps comprising:
   (g1) using the video mode to transfer data through a transducer at a disc location identified by the sector address associated with the first-received command; and
   (g2) using the standard mode and the sector addresses associated with the standard commands, executing the standard commands in a sequence that is partially based on an estimated seek length for each of the standard commands.

22. An electromechanical device comprising:
one or more data storage disc(s):
a memory configured to hold several pending commands for accessing the disc(s), each of the commands having a unique tag; and
a controller configured to determine which of a plurality of queue execution modes to use for a selected one of the pending commands based on the selected command's tag.

23. The electromechanical device of claim 22 in which the memory is configured to hold the tag as a binary value no larger than one byte.

24. The electromechanical device of claim 22, further including an actuator having a nominal seek time longer than 1 millisecond.

25. The electromechanical device of claim 22 in which the memory includes a multiple-bit state register configured to identify one or more other tags that are available for a future command.

26. The electromechanical device of claim 22 in which the queue execution modes include a higher-priority mode associated with a first queue and a lower-priority mode associated with a second queue.

27. The electromechanical device of claim 26 in which the first queue is associated with a total of M tags, in which the second mode is associated with a total of N tags, and in which $N \geq 0$ and $M \geq 0$.

28. The electromechanical device of claim 22 in which the controller is operatively coupled to communicate with a host through a serial ATA bus.

29. The electromechanical device of claim 22, wherein the plurality of queue execution modes includes at least a standard mode and a video mode.

30. The electromechanical device of claim 22, wherein the electromechanical device receives instructions from a host device establishing the plurality of queue execution modes, wherein the instructions assign a unique set of tag values for each of the plurality of queue execution modes.

31. The electromechanical device of claim 30, wherein the tag values assigned to queue execution modes are sector count register values.

32. The electromechanical device of claim 22, wherein the controller is configured to execute the selected data access command according to the queue execution modes determined for the selected data access command.

33. A method comprising:
assigning a different unique tag to each of several data access commands; and
for each of the data access commands, executing the data access command according to one of a plurality of queue execution modes, wherein the one of a plurality of queue execution modes is selected based on the data access command's unique tag.

* * * * *